(12) United States Patent
Hu et al.

(10) Patent No.: US 7,062,904 B1
(45) Date of Patent: Jun. 20, 2006

(54) INTEGRATED $NO_x$ AND PM REDUCTION DEVICES FOR THE TREATMENT OF EMISSIONS FROM INTERNAL COMBUSTION ENGINES

(75) Inventors: Haoran Hu, Novi, MI (US); Subbaraya Radhamohan, Novi, MI (US); Karen Evelyn Bevan, Northville, MI (US); James Edward McCarthy, Jr., Canton, MI (US); Johannes W. Reuter, Ypsilanti, MI (US); Vishal Singh, Farmington Hills, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/059,238

(22) Filed: Feb. 16, 2005

(51) Int. Cl.
*F01N 3/00* (2006.01)

(52) U.S. Cl. .............. 60/286; 60/274; 60/295; 60/297; 60/301; 60/311

(58) Field of Classification Search ............ 60/274, 60/286, 295, 297, 301, 311; 55/DIG. 30
See application file for complete search history.

(56) References Cited

U.S. PATENT DOCUMENTS

| | | | |
|---|---|---|---|
| 5,746,989 A * | 5/1998 | Murachi et al. | 423/213.7 |
| 6,314,722 B1 * | 11/2001 | Matros et al. | 60/274 |
| 6,732,507 B1 * | 5/2004 | Stanglmaier et al. | 60/285 |
| 6,820,414 B1 * | 11/2004 | Stroia et al. | 60/286 |
| 6,826,906 B1 | 12/2004 | Kakwani et al. | |
| 6,843,054 B1 * | 1/2005 | Taylor et al. | 60/275 |
| 6,883,311 B1 * | 4/2005 | Liu | 60/295 |
| 6,892,529 B1 * | 5/2005 | Duvinage et al. | 60/286 |
| 2003/0190269 A1 | 10/2003 | Liu et al. | |
| 2004/0037754 A1 | 2/2004 | van Setten et al. | |
| 2004/0116267 A1 | 2/2004 | Yezeretes et al. | |
| 2004/0052699 A1 | 3/2004 | Molinier et al. | |
| 2004/0076565 A1 | 4/2004 | Gandhi et al. | |
| 2004/0141890 A1 | 7/2004 | Hirata et al. | |
| 2004/0175315 A1 | 9/2004 | Brisley et al. | |
| 2004/0254073 A1 | 12/2004 | Wei et al. | |
| 2005/0031514 A1 | 2/2005 | Patchett et al. | |

FOREIGN PATENT DOCUMENTS

| | | | |
|---|---|---|---|
| WO | WO 2004/061278 A1 | 7/2004 | |
| WO | WO 2005/014146 A1 | 2/2005 | |

* cited by examiner

*Primary Examiner*—Thomas Denion
*Assistant Examiner*—Diem Tran
(74) *Attorney, Agent, or Firm*—Paul V. Keller, LLC

(57) ABSTRACT

One aspect of the invention relates to a particulate filter useful in treating exhaust from a diesel-power vehicle. The particulate filter comprises filter elements for removing particulate matter and an ammonia SCR catalyst. Ammonia can be produced during regeneration of an NOx adsorbant. The adsorbant can be contained in a separate device upstream of the particulate filter or be incorporated within the particulate filter. Another aspect of the invention relates to a method of cleaning exhaust comprising passing the exhaust over an NOx adsorber to adsorb a portion of NOx from the exhaust; passing the exhaust through a particulate filter to remove particulate matter from the exhaust; and removing a further portion of NOx from the exhaust by reducing it with ammonia over an ammonia SCR catalyst. Preferably, a catalyst contained within the adsorbant provides $NO_2$ for continuously regenerating the particulate filter.

3 Claims, 3 Drawing Sheets

INTEGRATED NO$_x$ AND PM REDUCTION DEVICES FOR THE TREATMENT OF EMISSIONS FROM INTERNAL COMBUSTION ENGINES

FIELD OF THE INVENTION

The present invention relates to the field of pollution control devices for internal combustion engines, especially diesel engines and lean burn gasoline engines.

BACKGROUND OF THE INVENTION

NO$_x$ emissions from vehicles with internal combustion engines are an environmental problem recognized worldwide. Several countries, including the United States, have long had regulations pending that will limit NO$_x$ emissions from vehicles. Manufacturers and researchers have put considerable effort toward meeting those regulations. In conventional gasoline powered vehicles that use stoichiometric fuel-air mixtures, three-way catalysts have been shown to control NO$_x$ emissions. In diesel powered vehicles and vehicles with lean-burn gasoline engines, however, the exhaust is too oxygen-rich for three-way catalysts to be effective.

Several solutions have been proposed for controlling NOx emissions from diesel powered vehicles and lean-burn gasoline engines. One set of approaches focuses on the engine. Techniques such as exhaust gas recirculation and homogenizing fuel-air mixtures can reduce NOx emissions. These techniques alone, however, will not solve the problem. Another set of approaches remove NOx from the vehicle exhaust. These include the use of lean-burn NO$_x$ catalysts, lean NO$_x$ traps (LNTs), and selective catalytic reduction (SCR).

Lean-burn NOx catalysts promote the reduction of NO$_x$ under oxygen-rich conditions. Reduction of NOx in an oxidizing atmosphere is difficult. It has proved challenging to find a lean-burn NO$_x$ catalyst that has the required activity, durability, and operating temperature range. Lean-burn NO$_x$ catalysts also tend to be hydrothermally unstable. A noticeable loss of activity occurs after relatively little use. Lean burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiency with lean-burn catalysts is unacceptably low.

A lean NOx trap (LNT) is an NOx adsorber combined with a catalyst for NOx reduction. The adsorber removes NOx from lean exhaust. Periodically, the adsorber is regenerated by creating a reducing environment. In the reducing environment, NOx is reduced over the catalyst. The adsorbant is generally an alkaline earth oxide adsorbant, such as BaCO$_3$ and the catalyst can be a precious metal, such as Ru.

SCR involves the reduction of NOx by ammonia. The reaction takes place even in an oxidizing environment. The NOx can be temporarily stored in an adsorbant or ammonia can be fed continuously into the exhaust. SCR can achieve NOx reductions in excess of 90%, however, there is concern over the lack of infrastructure for distributing ammonia or a suitable precursor. SCR also raises concerns relating to the possible release of ammonia into the environment.

U.S. Pat. No. 6,560,958 describes an LNT system in which hydrogen-rich synthesis gas (syn gas), including H$_2$ and CO, is used as a reductant to regenerate the adsorbent. The syn gas is produced from diesel fuel in a plasma converter. Periodically, the LNT is taken offline from the exhaust system and supplied with the syn gas. A dual adsorber system is also described.

U.S. Pat. No. 6,732,507 describes a hybrid exhaust treatment system using an LNT and an SCR catalyst in series. The SCR catalyst captures ammonia produced by the LNT during regeneration and uses the captured ammonia to increase the extent of NOx conversion.

U.S. Patent Application Publication No. 2004/0052699 describes an exhaust treatment device in which the functionalities of a catalytic particulate filter and a NOx adsorber-catalyst are combined into a single device. In one embodiment, a wash coat comprising an NOx adsorbant is applied to a surface of a filter element.

There continues to be a long felt need for reliable, affordable, and effective systems for removing NOx and particulate matter from the exhaust of diesel and lean-burn gasoline engines.

SUMMARY OF THE INVENTION

One concept of the inventors relates to a particulate filter useful in treating exhaust from a diesel-power vehicle. The particulate filter comprises filter elements for removing particulate matter and an ammonia SCR catalyst. The ammonia can be produced during regeneration of an NOx adsorbant. An NOx adsorbant can be contained in a separate device upstream of the particulate filter or be incorporated within the particulate filter. The invention utilizes surfaces of the particulate filter to support an SCR catalyst and thereby combines a particulate filter and an SCR catalyst bed into a single device. The device may further perform the functions of an LNT.

Another concept of the inventors relates to a method of cleaning exhaust. The method comprises passing the exhaust over an NOx adsorber to adsorb a portion of NOx from the exhaust; passing the exhaust through a particulate filter to remove particulate matter from the exhaust; and removing a further portion of NOx from the exhaust by reducing it with ammonia over an ammonia SCR catalyst. Preferably, a catalyst contained within the adsorbant provides NO$_2$ for continuously regenerating the particulate filter.

The forgoing summary encompasses certain of the inventors' concepts. Its primary purpose is to present these concepts in a simplified form as a prelude to the more detailed description that follows. The summary is not a comprehensive description of what the inventors have invented. Other concepts of the inventors will become apparent to one of ordinary skill in the art from the following detailed description and annexed drawings. Moreover, the detailed description and annexed drawings draw attention to only certain of the inventors' concepts and set forth only certain examples and implementations of what the inventors have invented. Other concepts of the inventors and other examples and implementations of their concepts will become apparent to one of ordinary skill in the art from that which is described and/or illustrated.

DETAILED DESCRIPTION OF THE INVENTION

A particulate filter is a relatively large device and is only one of several devices that may be required in a diesel exhaust system to meet emissions control regulations. Incidental to its main function, which is to physically screen particulate matter from exhaust gases, a typical particulate filter occupies a large volume and presents a large contact area to the exhaust gases. The space taken up by a particulate filter and/or the filter's large contact area can be used to facilitate a second function. In one aspect of the invention, that function is that of an SCR catalyst bed.

Figure 1:
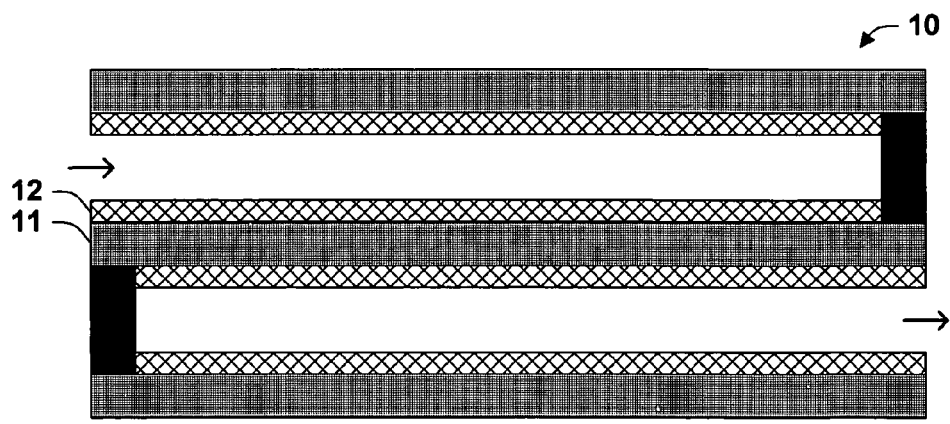
FIG. 1 is a schematic illustration of a particulate filter incorporating an SCR catalyst.

FIG. 1 is a schematic illustration of an exemplary particulate filter/SCR catalyst 10. The device 10 comprises filter elements 11 and catalyst elements 12. The filter elements 11 are porous and the structure of the device 10 generally causes exhaust gases to pass through the filter elements 11. The catalyst elements 12 comprise an ammonia SCR catalyst. In FIG. 1, the ammonia SCR catalyst is formed into a porous wash coat that lies over the external surfaces of the filter elements 11. Optionally the SCR wash coat covers only the inlet side of the filter elements 11 and optionally the SCR wash coat covers only the outlet side of the filter elements 11.

Figure 2:
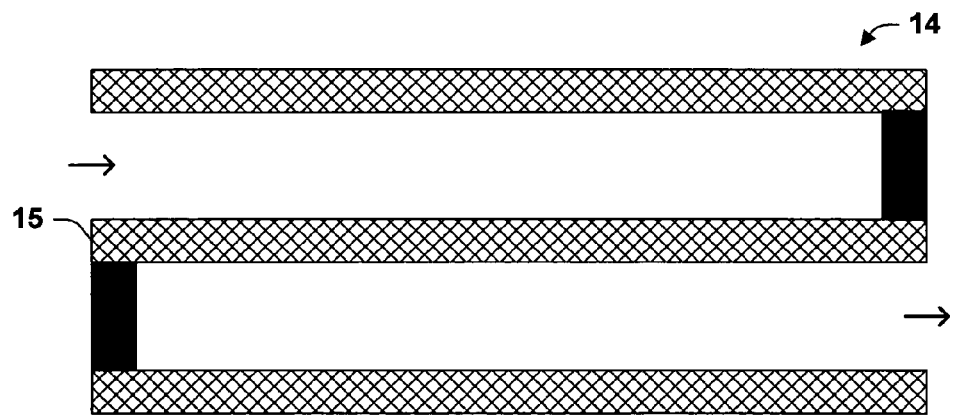
FIG. 2 is a schematic illustration of a particulate filter incorporating an SCR catalyst in a different way.

FIG. 2 illustrates another particulate filter/SCR catalyst 14. In this embodiment, the ammonia SCR catalyst forms a wash coat that conforms to the high internal surface area of filter elements 15, whereby the SCR catalyst is disposed within the filter elements 15. The high internal surface area of the filter elements 15 and the flow of exhaust gases through those filter elements provides a high degree of contacting between the exhaust gases and the catalyst, thereby making efficient use of the catalyst and avoiding the need for a separate ammonia SCR catalyst device where an ammonia SCR catalyst is desired.

A particulate filter/SCR catalyst can have any of the configurations suitable for a diesel particulate filter. Examples of suitable configurations include monolithic wall flow filters, which are typically made from ceramics, especially cordierite or SiC, blocks of ceramic foams, monolith-like structures of porous sintered metals or metal-foams, and wound, knit, or braided structures of temperature resistant fibers, such as ceramic or metallic fibers. Typical pore sizes for the filter elements are about 10 μm or less, although larger pores may be initially formed in anticipation of pore sizes being reduced by the application of a catalyst-containing wash coat. On the other hand, the ammonia SCR catalyst can be incorporated into the filter material.

An ammonia SCR catalyst is one that effectively catalyzes a reaction such as:

$$4NO + 4NH_3 + O_2 \rightleftharpoons 4N_2 + 6H_2O$$

in lean exhaust. Catalysts for this reaction will also reduce other species of NOx. $NO_x$ includes, without limitation, NO, $NO_2$, $N_2O$, and $N_2O_2$. Examples of SCR catalysts include oxides of metals such as Cu, Zn, V, Cr, Al, Ti, Mn, Co, Fe, Ni, Pd, Pt, Rh, Rd, Mo, and W. Other examples of ammonia SCR catalyst include zeolites, such as ZSM-5 or ZSM-11 substituted with metal ions such as cations of Cu, Co, Ag, Zn, or Pt, and activated carbon. A preferred catalyst is a combination of $TiO_2$, with one or more of $WO_3$, $V_2O_5$, and $MoO_3$, for example about 70 to about 95% by weight $TiO_2$, about 5 to about 20% by weight $WO_3$ and/or $MoO_3$, and 0 to about 5% by weight $V_2O_3$. Catalysts of this type are commercially available and can be tailored by the manufacturer for specific applications. The typical temperature range in which these catalysts are effective is from about 230 to about 500° C. If the temperature is too high, the ammonia decomposes before reducing NOx.

Figure 3:
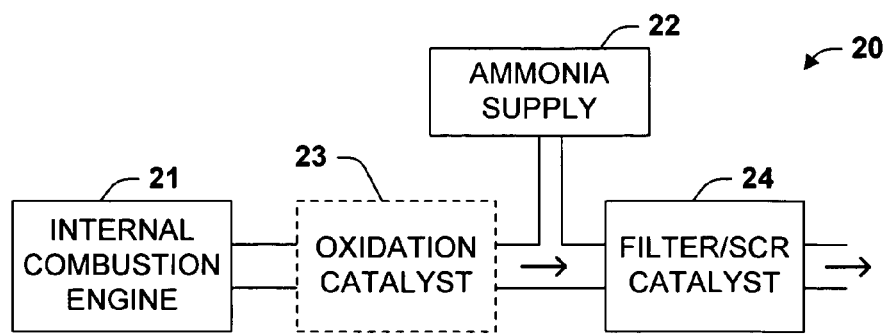
FIG. 3 is a schematic illustration of a power generation system.

FIG. 3 is an exemplary power generation system 20 employing a particulate filter/SCR catalyst 24, which can have the structure of either the particulate filter/SCR catalyst 10 or the particulate filter/SCR catalyst 14. The power generation system 20 comprises an internal combustion engine 21, which is typically a compression ignition diesel engine, an ammonia supply 22, and an optional oxidation catalyst 23. The ammonia supply 22 provides ammonia for the NOx reduction reaction in the device 10. The optional oxidation catalyst 23 converts NO to $NO_2$ to facilitate continuous removal of accumulated soot from the device 10. Converting NO to $NO_2$ also facilitates the reduction of $NO_x$ by $NH_3$ over the SCR catalyst.

Any suitable method can be used to remove accumulated soot from the particulate filter/SCR catalyst 24. Two general approaches are continuous and intermittent regeneration. An example of continuous regeneration depends on the reaction of soot with $NO_2$. Soot will react with $NO_2$ at a lower temperature than with $O_2$. The optional oxidation catalyst 23 can comprise a transition metal, preferably platinum, and catalyzes a reaction of NO with $O_2$ to form $NO_2$. The combined filter/SCR catalyst 24 can contain a catalyst to further lower the effective temperature for soot oxidation. Examples of catalysts for the oxidation of soot by $NO_2$ include oxides of Ce, Zr, La, Y, and Nd. A soot oxidation catalyst is preferably concentrated on the inlet side of the filter elements 15, where soot accumulates.

While FIG. 3 illustrates The oxidation catalyst 23 in a separate brick upstream of a filter 24 containing an SCR catalyst, an oxidation catalyst and an SCR catalyst can be distributed in any suitable fashion within an exhaust system comprising a combined filter/SCR catalyst according to the present invention. In one embodiment, the two catalyst are co-dispersed, but generally they are dispersed separately with one upstream of the other. The advantage of having the oxidation catalyst upstream of the SCR catalyst is that it converts NO to $NO_2$, which facilitates the ammonia SCR reaction. The disadvantage of having the oxidation catalyst upstream of the SCR catalyst is that, in some configurations, the oxidation catalyst may oxidize ammonia.

In one embodiment, the SCR catalyst is upstream of the oxidation catalyst. For example, the SCR catalyst can be formed in a washcoat on the inlet side of the filter, while the oxidation catalyst is contained in an underlying coating.

In another embodiment, the oxidation catalyst is upstream of the SCR catalyst, for example in a brick upstream from the filter as in FIG. 3, and ammonia is supplied between the oxidation catalyst and the SCR catalyst. In a further embodiment, the system contains a NOx adsorbant, and the oxidation catalyst is upstream of the adsorbant and the filter. In a still further embodiment, the NOx adsorbant is associated with a catalyst that is effective for converting NO to $NO_2$ and the NOx adsorber/catalyst acts as the oxidation catalyst. A NOx adsorber catalyst can for a separate brick upstream of the filter/SCR catalyst or be incorporated within the filter/SCR catalyst as described more fully below.

An example of an intermittent regeneration process is one where the filter/SCR catalyst 24 is heated to a temperature where soot reacts with oxygen. The process can be controlled by measuring the pressure drop across the filter/SCR catalyst 24 and initiating the regeneration process based on the pressure exceeding a critical value. The filter/SCR catalyst 24 can be heated by any suitable method. Examples of suitable heating methods may include electrical resistance heating and a fuel burner located upstream of the filter/SCR catalyst 24. Electrical resistance can involve applying a voltage directly to the filter/SCR catalyst or to resistance wires permeating the device. Soot oxidation is exothermic. It may be possible to initiate the soot oxidation reaction in a localized area of the filter/SCR catalyst 24 and have the reaction propagate through the rest of the device.

The ammonia supply 22 can be any suitable ammonia source. Examples of ammonia sources include reservoirs, such as reservoirs of ammonia, ammonium carbomate, or urea, and ammonia plants, such as plants that form ammonia from $H_2$ and $N_2$ or from $H_2$ and NOx. $N_2$ can be obtained from air and $H_2$ can be produced by a fuel reformer. Ammonia, whatever its source, is optionally stored in one or more adsorption beds, such as molecular sieve adsorption beds, and desorbed as needed.

Figure 4:
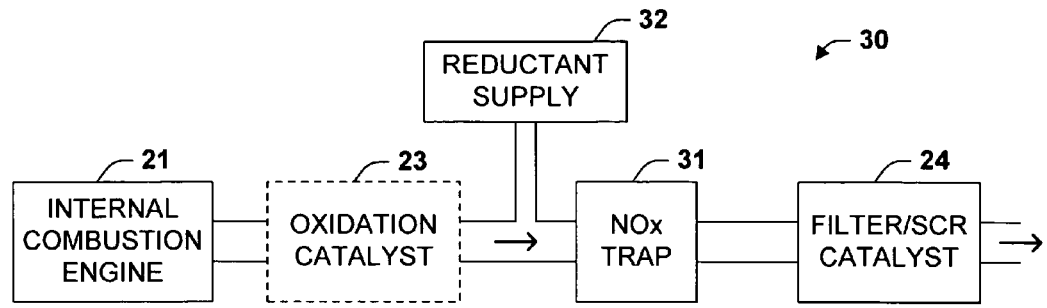
FIG. 4 is a schematic illustration of another power generation system.

FIG. 4 is a schematic illustration of an exemplary power generation system 30 employing the filter/SCR catalyst 24 in a different configuration. The exemplary power generation system 30 comprises the internal combustion engine 21, a NOx trap 31, an optional reductant supply 32, an optional oxidation catalyst 23, and the filter/SCR catalyst 24. The NOx trap 31 is regenerated intermittently. Regeneration generally comprises supplying reductant to the NOx trap 31. The reductant can be obtained from the optional reductant supply 32, although reductant can also be obtained by running the engine 21 rich for a period of time. During regeneration, ammonia and some NOx are released from the NOx trap 31. The ammonia reacts to reduce NOx in the filter/SCR catalyst 24. The filter/SCR catalyst 24 can include an ammonia adsorbant to buffer the ammonia. The filter/SCR catalyst 24 thereby improves NOx removal, reduces ammonia emissions, and reduces the amount of reductant required. The ammonia supply 22 can also be incorporated in the power generation system 30 to reduce a further portion of NOx remaining in the exhaust entering the device 10.

The NOx trap 31 comprises a NOx adsorption bed and a catalyst effective for reducing NOx in a reducing environment. In some cases, the catalyst contributes to the adsorbant function and is necessarily provided in the adsorbant bed. In other cases, the catalyst is optionally provided in a separate bed downstream of the adsorption bed. The adsorption bed comprises an effective amount of an adsorbent for NOx in an oxidizing (lean) environment. The NOx trap 31 desorbs and/or reduces NOx in a reducing environment, provided that the lean NOx trap is in an appropriate temperature range.

Figure 6:
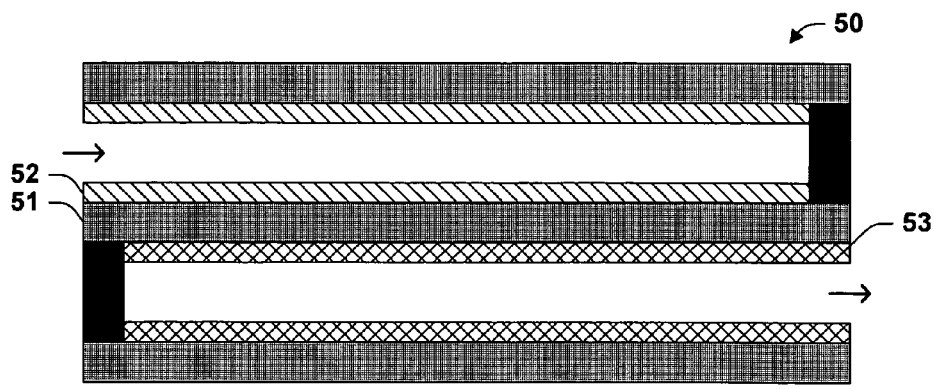
FIG. 6 is a schematic illustration of a particulate filter incorporating an SCR catalyst and an NOx adsorbant.

The NOx trap 31 can be incorporated into the filter/SCR catalyst 24. For example, the NOx adsorbant and catalyst can be coated over the inlet passages of the combined filer/SCR catalyst 24. FIG. 6 provides a schematic illustration of a combined SCR catalyst, NOx adsorbant, and particulate filter 50. An NOx adsorber/catalyst 52 coat the inlet sides of filter elements 51, while an SCR catalyst 53 coats the outlet sides of the filter elements 51. The adsorber/catalyst 52 preferably enriches the ratio of $NO_2$ to NO in the $NO_x$ it does not adsorb.

The adsorption bed can comprise any suitable adsorbant material. Examples of adsorbant materials include molecular sieves, such as zeolites, alumina, silica, and activated carbon. Further examples are oxides, carbonates, and hydroxides of alkaline earth metals such as Mg, Ca, Sr, and Be or alkali metals such as K or Ce. Still further examples include metal phosphates, such as phoshates of titanium and zirconium.

Molecular seives are materials having a crystalline structure that defines internal cavities and interconnecting pores of regular size. Zeolites are the most common example. Zeolites have crystalline structures generally based on atoms tetrahedrally bonded to each other with oxygen bridges. The atoms are most commonly aluminum and silicon (giving aluminosilicates), but P, Ga, Ge, B, Be, and other atoms can also make up the tetrahedral framework. The properties of a zeolite may be modified by ion exchange, for example with a rare earth metal or chromium. Preferred zeolites generally include rare earth zeolites and Thomsonite. Rare earth zeolites are zeolites that have been extensively (i.e., at least about 50%) or fully ion exchanged with a rare earth metal, such as lanthanum. For NOx traps generally, a preferred adsorbant is an alkaline metal or an alkaline earth metal oxide loaded with a precious metal.

The adsorbant is typically combined with a binder and either formed into a self-supporting structure or applied as a coating over a substrate, which can be a particulate filter. A binder can be, for example, a clay, a silicate, or a cement. Portland cement can be used to bind molecular sieve crystals. Generally, the adsorbant is most effective when a minimum of binder is used. Preferably, the adsorbant bed contains from about 3 to about 20% binder, more preferably from about 3 to about 12%, most preferably from about 3 to about 8%.

Devices according to the present invention are generally adapted for use in vehicle exhaust systems. Vehicle exhaust systems create restriction on weight, dimensions, and durability. For example, an adsorption bed for a vehicle exhaust system must be reasonably resistant to degradation under the vibrations encountered during vehicle operation.

When the adsorbant bed is not part of the filter, the adsorbant bed can have any suitable structure. Examples of suitable structures may include monoliths, packed beds, and layer screening. A packed bed is preferably formed into a cohesive mass by sintering the particles or adhering them with a binder. When the bed has an adsorbant function, preferably any thick walls, large particles, or thick coatings have a macro-porous structure facilitating access to micropores where adsorption occurs. A macro-porous structure can be developed by forming the walls, particles, or coatings from small particles of adsorbant sintered together or held together with a binder.

Preferably an NOx adsorption bed has a large capacity for adsorbing a NOx species at a typical exhaust temperature and NOx partial pressure. Preferably, the adsorbant can adsorb at least about 3% of a NOx species by weight adsorbant at a typical exhaust temperature and 1 torr partial pressure of the NOx species, more preferably at least about 5% by weight adsorbant, and still more preferably at least about 7% by weight adsorbant. The weight of adsorbant does not include the weight of any binders or inert substrates. Depending on the application, a typical exhaust temperature may be 350° C.

The NOx adsorbant bed preferably comprises a catalyst for the reduction of NOx in a reducing environment. The catalyst can be, for example, one or more precious metals, such as Au, Ag, and Cu, group VIII metals, such as Pt, Pd, Ru, Ni, and Co, Cr, Mo, or K. A typical catalyst includes Pt and Rh, although it may be desirable to reduce or eliminate the Rh to favor the production of $NH_3$ over $N_2$. Effective operating temperatures are generally in the range from about 200 to about 450° C. Lower temperatures may also be desirable in terms of favoring the production of $NH_3$ over $N_2$.

The catalyst of the NOx trap 31 can also serve the function of the optional oxidation catalyst 23: providing $NO_2$ for continuous oxidation of soot in the device 10. A further option is to provide the NOx trap 31 with an additional catalyst for the sole purpose of oxidizing some of the escaping NO to $NO_2$. Such a catalyst is preferably concentrated near the outlet of the NOx trap 31.

The reductant source 32 can supply any suitable reductant. Examples of suitable reductants include synthesis gas (syn gas), hydrocarbons, and oxygenated hydrocarbons. Syn gas includes $H_2$ and CO. The reductant can be a fuel for the internal combustion engine 21. The fuel can be injected into the exhaust.

The reductant source 32 is preferably a fuel reformer producing simple hydrocarbons, such as syn gas. Simple hydrocarbons are generally more reactive than more complex hydrocarbons in regenerating the NOx trap 31. A fuel reformer can be a catalytic reformer, a steam reformer, an autothermal reformer, or a plasma reformer. A reformer catalyst is one that favors the production of CO and $H_2$ (syn gas) and small hydrocarbons over complete oxidation of the diesel fuel to form $CO_2$ and $H_2O$. Examples of reformer catalysts include oxides of Al, Mg, and Ni, which are typically combined with one or more of CaO, $K_2O$, and a rare earth metal such as Ce to increase activity. A reformer would generally be supplied with a fuel for the internal combustion engine 21. The reformer would also be supplied with an oxygen source, such as air or lean exhaust. Lean exhaust can be drawn from a high pressure portion of the exhaust system, such as from a manifold upstream of a turbine used in a turbo charge system. A fuel reformer is optionally placed directly in the exhaust stream.

During regeneration, sufficient reductant must be provided to consume free oxygen in the exhaust while leaving enough reductant left over to regenerate the NOx trap 31. The reaction of free oxygen can take place either before the NOx trap 31 or in the NOx trap 31. In one embodiment, the reaction with oxygen takes place in a fuel reformer provided in the exhaust stream. In another embodiment, the reductant is injected in two parts. A first part is a fuel directly injected into the exhaust to consumer excess oxygen. A second part is syn gas, which is less efficient for consuming excess oxygen, but more efficient for reducing NOx.

Any suitable strategy can be used to control the regeneration of the NOx trap 31. As opposed to a simple periodic regeneration scheme, the control scheme can involve determination of one or more of the following parameters: the time at which a regeneration cycle is initiated, the duration of a regeneration cycle, and the reductant concentration during a regeneration cycle.

One method of determining when to initiate a regeneration cycle involves measuring the NOx concentration downstream of the device 10. When this concentration exceeds a target level, regeneration begins.

During regeneration, some NOx desorbs from the NOx trap 31. Particularly during the first part of the regeneration cycle, some NOx escapes the NOx trap 31 un-reacted. If there is no stored ammonia in the device 10 and no ammonia supply 22, the escaping NOx is released into the atmosphere. To avoid this, in one embodiment regeneration begins while ammonia remains in the device 10.

Regeneration can be initiated based on the concentration of ammonia in the device 10 falling to a critical value. This approach involves maintaining an estimated of the amount of ammonia in the device 10. Maintaining this estimate generally involves measuring ammonia and NOx concentrations between the NOx trap 31 and the device 10.

Another control strategy is simply focused on increasing ammonia production during regeneration of the NOx trap 31. When an NOx trap is saturated with NOx, relatively little ammonia production is observed. Over the course of a regeneration cycle for a saturated NOx trap, as the amount of NOx in the trap decreases, ammonia production increases. By starting the regeneration cycle prior to saturation, the production of ammonia in favor of $N_2$ can be increased. Accordingly, in another embodiment, regeneration begins when the NOx trap 31 reaches a certain level of saturation, which is preferably in the range from about 5 to about 50% saturation, more preferably from about 10 to about 30% saturation. The degree of saturation can be estimated from measurements or a model-based estimate of the amount of NOx in the exhaust and a model for the NOx trap 31's adsorption efficiency and capacity. Preferably, the control scheme is effective whereby the fraction of adsorbed NOx converted to ammonia is at least about 20%, more preferably at least about 40%.

Using the foregoing control method, the amount of ammonia released from the NOx trap 31 may exceed the amount of NOx passing through the NOx trap 31. This excess ammonia can be used to reduce a stream of exhaust that bypasses the NOx trap 31. The ability to produce excess ammonia allows an NOx trap to function as the ammonia supply 22. Similarly, excess ammonia production is useful in a system with two or more adsorbers as described more fully below.

In another embodiment, regeneration is timed to control a ratio between total ammonia and NOx released by the NOx trap 31. The ratio may be targeted at one to one (a stoichiometric ratio), whereby the ammonia produced by the NOx trap 31 is just enough to reduce the NOx passing through to the device 10. Preferably, however, the ratio is slightly less, whereby ammonia slip can be avoided. A lesser amount of ammonia is preferably from about 60 to about 95% of a stoichiometric amount. The amount may also be reduced by an efficiency factor accounting for the fact that, depending on the structure, catalyst loading, and temperature of the device 10, a significant fraction of the NOx supplied to the device 10 may not react with ammonia even when adequate ammonia is available. Feedback control can be used to obtain the target ratio. In particular, the time between regeneration cycles can be shortened to increase ammonia production and lengthened to decrease ammonia production, with the ultimate goal of creating a balance between ammonia production and NOx emission from the NOx trap 31.

A control strategy can also be used to determine when to terminate a regeneration cycle, as opposed to the alternative of terminating the regeneration cycle after a fixed or predetermined period of time. Typically, the amount of NOx in the NOx trap 31 can be determined from vehicle operating conditions and a few measurements. The amount of reductant required to regenerate the NOx trap 31 can then be calculated. Nevertheless, it can be advantageous to use feedback control to determine when to conclude a regeneration cycle. In a preferred embodiment, a regeneration cycle is terminating according to measurements of the ammonia concentration downstream of the NOx trap 31.

As a regeneration cycle progresses, the ammonia concentration downstream of an NOx trap 31 first increases, then decreases. The regeneration cycle can be terminated at any recognizable point in the ammonia concentration curve. Most preferably, the regeneration cycle is ended upon the ammonia concentration falling below a target value following a peak. As the ammonia concentration is falling, progressively more unused reductant is slipping through the NOx trap 31. Therefore, the target value is a design choice reflecting a trade-off between maximizing ammonia production and minimizing reductant slip.

Another control strategy relates to the rate at which reductant is injected. Reductant injection rate can be targeted to a particular equivalence ratio. An equivalence ratio is based on the fuel-air mixture as supplied to the engine 21, with a stoichiometric ratio having an equivalence ratio of one. Additional reductant injected into the exhaust downstream of the engine 21 is figured into the equivalence ratio just as if it were supplied to the engine 21.

In one embodiment, the reductant injection rate is maximized subject to a limit on reductant breakthrough. Generally, increasing the equivalence ratio increases the ammonia production rate and minimizes the regeneration time. Where the reductant is injected into the exhaust, reducing the regeneration time reduces the fuel penalty. During regeneration, reductant must be supplied to consume free oxygen in the exhaust. This reductant is in excess of the reductant used to reduce NOx. The total amount of oxygen to consume depends on the length of the regeneration cycle. If the regeneration cycle is shorter, the molar flow of oxygen that must be reduced is less.

In a preferred embodiment, the reductant breakthrough rate is determined by an oxidizable species sensor downstream of the device 10. All oxidizable species can be considered reductant. For purposes of control, the breakthrough rate is preferably expressed as a fraction of the injection rate in excess of the injection rate required to consume free oxygen. For example, if doubling the excess injection rate over the amount required to consume free oxygen only doubles the breakthrough rate, the fractional conversion of reductant has not decreased at all. In one embodiment, the reductant injection rate is controlled to give from about 50 to about 95% conversion of reductant in excess of the amount required to consume free oxygen, in another embodiment from about 70 to about 90% conversion.

Figure 5:
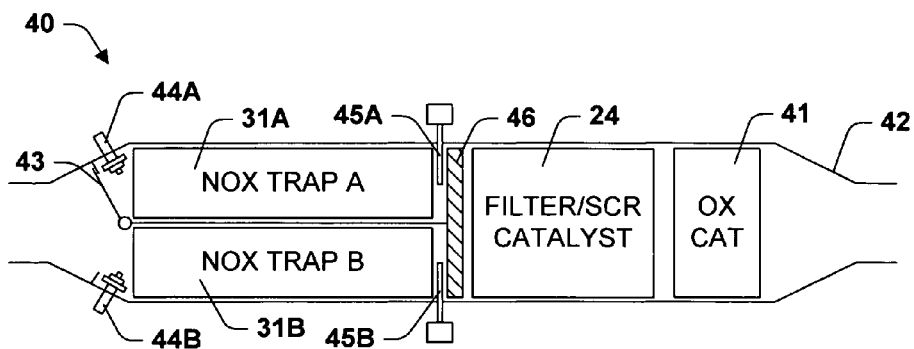
FIG. 5 is a schematic illustration of an exhaust treatment system.

Another method of reducing the fuel penalty is to employ a dual adsorber system as schematically illustrated by the exhaust system 40 of FIG. 5. The exhaust system 40 has twin lean NOx traps 31A and 31B, the filter/SCR catalyst 24, and an optional clean-up oxidation catalyst 41 all contained in a single housing 42. The exhaust flow can be diverted to one or the other NOx traps by a damper 43. Injection ports 44A and 44B are configured to provide reductant to one or the other of the NOx traps 31A and 31B. Sample ports 45A and 45B are provided to sample the outflows of the NOx traps 31A and 31B respectively for purposes of control. Rather than use sample ports, sensors can be placed inside the housing 42. The outflows of NOx traps 31A and 31B combine after passing through baffling device 46, which is designed to promote mixing of the two streams. After passing through the filter/SCR catalyst 24, the exhaust is treated by the oxidation catalyst 41 to convert escaping ammonia and reductant to more benign species.

One advantage of a dual adsorber system is that reducing agent does not need to be wasted consuming free oxygen in the exhaust during regeneration. Another advantage is that the reducing agent does not need to be diluted with the exhaust. This increases the concentration of the reducing agent and thereby the efficiency with which it reacts. A further advantage is that the residence time of the reducing agent in the NOx traps 31A and 31B can be increased. The residence time can be increased both because the residence time is not limited by the exhaust flow rate and because more time can be taken to regenerates the NOx traps. A longer residence time allows for a higher conversion efficiency for a given amount of catalyst.

Additional advantages can be realized when the outflows of the NOx traps are combined. One advantage is that excess reductant from the NOx traps and ammonia slipping from the filter/SCR catalyst 24 can be reduced by the oxidation catalyst 41 without injecting oxygen. In a system that does not have a unified flow, there is no free oxygen in the exhaust downstream of the NOx traps during regeneration. Air must be injected or another oxygen source provided to oxidize unconverted hydrocarbons and $NH_3$. With a unified flow, ample oxygen is generally supplied by the exhaust.

Another advantage of a unified flow is that the ammonia production rate from one of the NOx traps 31A and 31B can be controlled to match the NOx flow rate from the other of the traps, whereby the NOx and $NH_3$ rates into the filter/SCR catalyst 24 remain in an approximately fixed proportion. Total ammonia production can be controlled through the frequency of regeneration and the reductant concentration and the rate of ammonia production can be controlled through the rate at which reductant is supplied.

To allow a unified flow, the pressure of the reductant injection must be regulated to a level above that of the exhaust at the point where the streams join. This can be accomplished without extra pumps, even when the reductant is syn gas. For example, syn gas can be generated from exhaust drawn from a high pressure point in the exhaust system and fuel drawn from a common rail. The feeds can be reacted while remaining at an elevated pressure.

Figure 7:
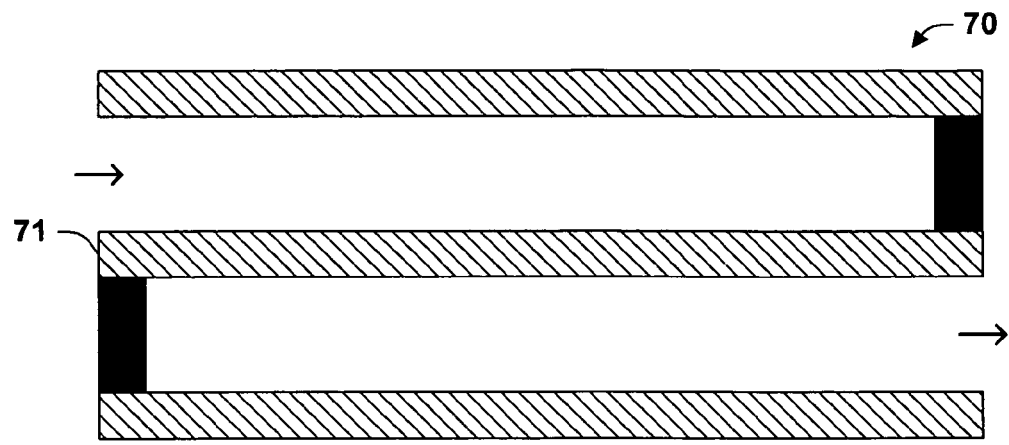
FIG. 7 is a schematic illustration of another particulate filter incorporating an NOx adsorbant.

According to another aspect of the invention, a particulate filter also acts as a NOx adsorber. The filter elements of the device are made with the adsorbant material. FIG. 7 provides a schematic illustration of an exemplary wall-flow particulate filter/NOx adsorber 70 in which the filter elements 71 comprise the adsorbant material. Preferably, the filter elements 71 comprise at least about 40% by weight adsorbant, more preferably at least about 60% by weight adsorbant, and still more preferably at least about 80% by weight adsorbant. In a preferred embodiment, the filter elements 71 are made up of adsorbant-containing particles bound together by sintering or held together with a binder. The filter pores are spaces between the particles. The adsorbant-containing particles together with any binder can be extruded to form a monolith structure of a wall flow filter. Alternating passages can be plugged at either end to direct the flow through the filter walls. The porosity of the filter can be controlled through the particle sizes. For example, particle sizes in the range from about 3 to about 20 μm may be appropriate. The particles themselves may have microporosity to allow effective utilization of the entire adsorbant mass.

Figure 8:
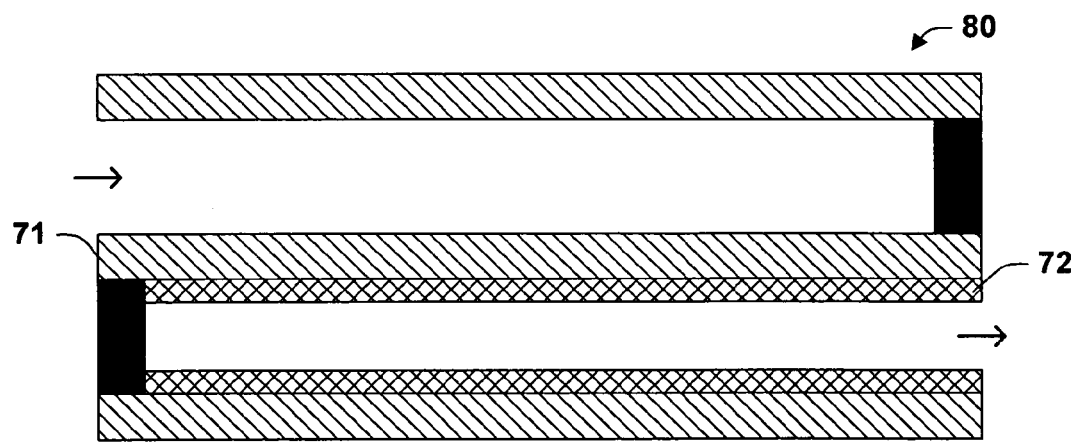
FIG. 8 is a schematic illustration of another particulate filter incorporating an NOx adsorbant and an SCR catalyst.

The combined adsorbant/particulate filter can be used in conjunction with an ammonia SCR catalyst. The catalyst can be placed downstream of the filter or incorporated into the filter. The catalyst can be incorporated into the filter by coating the internal surfaces of the filter elements with an SCR catalyst-containing wash coated. Alternatively a highly porous wash coat can be used that lies on top of the filter elements. Where the later type of wash coat is used, it can be selectively applied to the outlet sides of the filter elements. FIG. 8 provides an example 80, in which an SCR catalyst is provided in a wash coat 72 on the outlet side of the filter elements 71.

Another way of integrating the SCR catalyst is to co-disperse it with the adsorbant. For example, fine particles of an NOx-adsorbant, such as a NOx-adsorbing zeolite impregnated with a NOx trap catalyst, can be combined with fine particles of an SCR catalyst, for example an ammonia SCR catalyst zeolite or an ammonia-adsorbing zeolite impregnated with an ammonia SCR catalyst. The mixed particles can be combined in a wash coat over a supporting structure or formed into a self-supporting structure by sintering or binding.

Ammonia-adsorbing zeolites include faujasites and rare earth zeolites. Faujasites include X and Y-type zeolites. Rare earth zeolites are zeolites that have been extensively (i.e., at least about 50%) or fully ion exchanged with a rare earth metal, such as lanthanum.

The invention as delineated by the following claims has been shown and described in terms of certain concepts, aspects, embodiments, and examples. While a particular feature of the invention may have been disclosed with respect to only one of several concepts, aspects, examples, or embodiments, the feature may be combined with one or more other concepts aspects, examples, or embodiments where such combination would be recognized as advantageous by one of ordinary skill in the art. Also, this one specification may describe more than one invention and the following claims do not necessarily encompass every concept, aspect, embodiment, or example contained herein.

The invention claimed is:

1. A method of cleaning a diesel-powered vehicle's exhaust containing NOx and particulate matter, comprising:
   adsorbing a portion of the NOx on an adsorbant;
   filtering particulate matter from the exhaust using a filter downstream of the adsorbant;
   treating the exhaust upstream of the particulate filter with a catalyst that increases a ratio between $NO_2$ and NO in the exhaust at a point downstream of the adsorbant as compared to a ratio between $NO_2$ and NO in the exhaust upstream of the adsorbent; and
   reducing a portion of the remaining NOx by reaction with ammonia over an ammonia SCR catalyst contained within or downstream of the filter;
   wherein particulate matter is trapped on the particulate filter at approximately the same rate at which trapped particulate matter is oxidized by $NO_2$.

2. The method of claim 1, wherein the catalyst is combined with the adsorbant.

3. The method of claim 1, further comprising intermittently regenerating the adsorbant, wherein ammonia produced during the regeneration process reacts to reduce NOx over the ammonia SCR catalyst.

* * * * *